(12) United States Patent
Gruel et al.

(10) Patent No.: US 11,519,527 B2
(45) Date of Patent: Dec. 6, 2022

(54) HOSE ASSEMBLY AND METHOD OF USING HOSE ASSEMBLY

(71) Applicant: Caterpillar Inc., Peoria, IL (US)

(72) Inventors: Christopher Michael Gruel, Edwards, IL (US); Eric Rolland, Grenoble (FR); Christopher Carlos Herrera, Peoria, IL (US); Rajkumar Purushothaman, Chennai (IN)

(73) Assignee: Caterpillar Inc., Peoria, IL (US)

( * ) Notice: Subject to any disclaimer, the term of this patent is extended or adjusted under 35 U.S.C. 154(b) by 246 days.

(21) Appl. No.: 16/867,726

(22) Filed: May 6, 2020

(65) Prior Publication Data
US 2021/0348701 A1 Nov. 11, 2021

(51) Int. Cl.
*F16L 1/024* (2006.01)
*F16L 11/10* (2006.01)

(52) U.S. Cl.
CPC ..................... *F16L 11/10* (2013.01)

(58) Field of Classification Search
CPC ........ F16L 11/081; F16L 11/088; F16L 11/10; F16L 11/115; F16L 11/121; F16L 35/00
See application file for complete search history.

(56) References Cited

U.S. PATENT DOCUMENTS

| 790,971 | A | * | 5/1905 | Nicholls | F16L 35/00 |
|---|---|---|---|---|---|
| | | | | | 138/131 |
| 2,986,169 | A | * | 5/1961 | McCormick | B29D 23/18 |
| | | | | | 138/131 |
| 3,610,289 | A | * | 10/1971 | Moss | F16L 35/00 |
| | | | | | 138/131 |
| 3,881,754 | A | * | 5/1975 | Christie | F16L 35/00 |
| | | | | | 285/248 |
| 4,487,444 | A | * | 12/1984 | Hensen | F16L 11/10 |
| | | | | | 285/379 |
| 4,977,927 | A | | 12/1990 | Hill | |
| 5,036,890 | A | * | 8/1991 | Whaley | F16L 11/10 |
| | | | | | 138/109 |
| 5,548,093 | A | * | 8/1996 | Sato | F02M 35/1277 |
| | | | | | 138/121 |
| 6,193,282 | B1 | * | 2/2001 | Assenheimer | F16L 33/2076 |
| | | | | | 138/135 |

(Continued)

FOREIGN PATENT DOCUMENTS

| CN | 1303349 | 3/2007 |
|---|---|---|
| JP | 3810894 | 6/2006 |
| JP | 3967454 | 6/2007 |

*Primary Examiner* — Reinaldo Sanchez-Medina
(74) *Attorney, Agent, or Firm* — Harrity & Harrity, LLP (57) ABSTRACT

A hose assembly includes a hose and a support member. The hose includes a first portion, a second portion and a third portion. The first portion defines a first diameter. The second portion defines a second diameter that is different from the first diameter. The third portion defines a third diameter that is different from the first diameter and the second diameter. A first flange portion is defined at an intersection of the first portion and the second portion. A second flange portion is defined at an intersection of the second portion and the third portion. The support member includes a first end portion and a second end portion. The first end portion is adapted to engage with the first flange portion. The second end portion is adapted to engage with the second flange portion.

20 Claims, 5 Drawing Sheets

(56) References Cited

U.S. PATENT DOCUMENTS

| | | | |
|---|---|---|---|
| 6,510,905 B1 * | 1/2003 | Puttmann | E21B 17/203 |
| | | | 175/19 |
| 7,546,852 B1 * | 6/2009 | Fails | F16L 35/00 |
| | | | 138/139 |
| 8,691,035 B2 | 4/2014 | Pingleton et al. | |
| 2006/0112683 A1 | 6/2006 | Huber | |
| 2009/0320951 A1 * | 12/2009 | Witz | F16L 11/088 |
| | | | 29/890.144 |

* cited by examiner

HOSE ASSEMBLY AND METHOD OF USING HOSE ASSEMBLY

TECHNICAL FIELD

The present disclosure relates to a hose assembly and a method of using the hose assembly for fluid delivery.

BACKGROUND

Vehicles, such as commercial, passenger, or construction vehicles, typically include a fluid system, such as a hydraulic or pneumatic system, for operating one or more components associated with such vehicles. Such a fluid system generally includes components such as a reservoir, one or more pumps, actuators, hoses, valves, etc. In a construction vehicle, the fluid system may be associated with a linkage assembly or a braking system. Further, the hoses associated with the fluid system may be used to supply fluid to various components of the fluid system for operation thereof. For example, the hoses may be used to establish fluid communication between one or more components of the vehicle, such as the pumps and the reservoir via the valves.

Further, the hose is generally embodied as a flexible connection that allows the hose to be shaped around various rigid objects. Typically, the hose is provided with an additional support to prevent collapsing of the hose under vacuum conditions, while still allowing a degree of flexibility. This support is typically provided by a spring installed within the hose. However, in some cases, the spring may be incorrectly installed within the hose. More particularly, the hoses currently available in the market include a small expanded region, defining a lip portion for capturing the spring therein. However, as the spring is manually installed within the hose, the installation process is prone to errors, for example, the spring may be installed backwards. If the spring is installed incorrectly, the spring is susceptible to movement within the hose and cause failures in the fluid system.

Further, in some examples, the spring may be displaced from its position by the fluid flowing through the hose. For example, the hose may get displaced along a direction of fluid travel which may cause the spring to be pulled within the component to which the hose is coupled, thereby interfering with moving parts and causing failures. A displacement of the spring may also impair a vacuum resistance of the hose, which is not desirable. More particularly, a reduction of the vacuum resistance of the hose may cause the hose to collapse thereby effecting an operation of fluid system that the hose is associated with.

U.S. Publication Application Number 2006/0112683 describes an exhaust system for an implement, especially hedge clippers, trimmers, brush cutters, chain saws and the like, driven by an internal combustion engine, comprising an exhaust pipe for receiving exhaust gas from the engine, wherein the exhaust pipe has an outlet end opening out into the atmosphere, and a circumferentially extending condensate-guiding element disposed on the internal wall of the exhaust pipe, wherein the condensate-guiding element narrows the flow cross-section of the exhaust pipe.

Further, the exhaust system includes a spiral-shaped wire spring or coil spring inserted radially pre-tensioned into the free end of the exhaust pipe near the outlet end. Due to the radial pre-tensioning force, the wire spring is fixed in position in both a frictional and positive fit and conforms to the internal wall of the exhaust pipe on the inside. The exhaust pipe is also provided with an axial retainer at the outlet end to fix the position of the wire spring axially.

SUMMARY OF THE DISCLOSURE

In an aspect of the present disclosure, a hose assembly is provided. The hose assembly includes a hose. The hose includes a first portion defining a first diameter. The hose also includes a second portion disposed adjacent to the first portion. The second portion defines a second diameter that is different from the first diameter. Further, a first flange portion is defined at an intersection of the first portion and the second portion. The hose further includes a third portion disposed adjacent to the second portion such that the second portion extends between the first and third portions. The third portion defines a third diameter that is different from the first diameter and the second diameter. Further, a second flange portion is defined at an intersection of the second portion and the third portion. The hose assembly also includes a support member disposed within the second portion. The support member defines a first end portion and a second end portion. The first end portion is adapted to engage with the first flange portion and the second end portion is adapted to engage with the second flange portion for retention of the support member within the second portion.

In another aspect of the present disclosure, a method of using a hose assembly for directing a fluid flow therethrough is provided. The hose assembly includes a hose and a support member disposed within the hose. The method includes coupling a first portion of the hose to a first component. The first portion defines a first diameter. The hose further includes a second portion defining a second diameter that is lesser than the first diameter and a third portion defining a third diameter that is lesser than the first diameter and the second diameter. The method also includes coupling the third portion of the hose to a second component for directing the fluid flow from the first component towards the second component. The method further includes directing the fluid flow through the first, second, and third portions based on introduction of the fluid flow at the first portion. The fluid flow is adapted to apply a fluid force on the support member. The method includes retaining the support member within the second portion against the fluid force based on an engagement of a first end portion of the support member with a first flange portion defined at an intersection of the first and second portions and an engagement of a second end portion of the support member with a second flange portion defined at an intersection of the second and third portions. The method also includes introducing the fluid flow in the second component based on an exit of the fluid flow through the third portion.

Other features and aspects of this disclosure will be apparent from the following description and the accompanying drawings.

DETAILED DESCRIPTION

Figure 1:
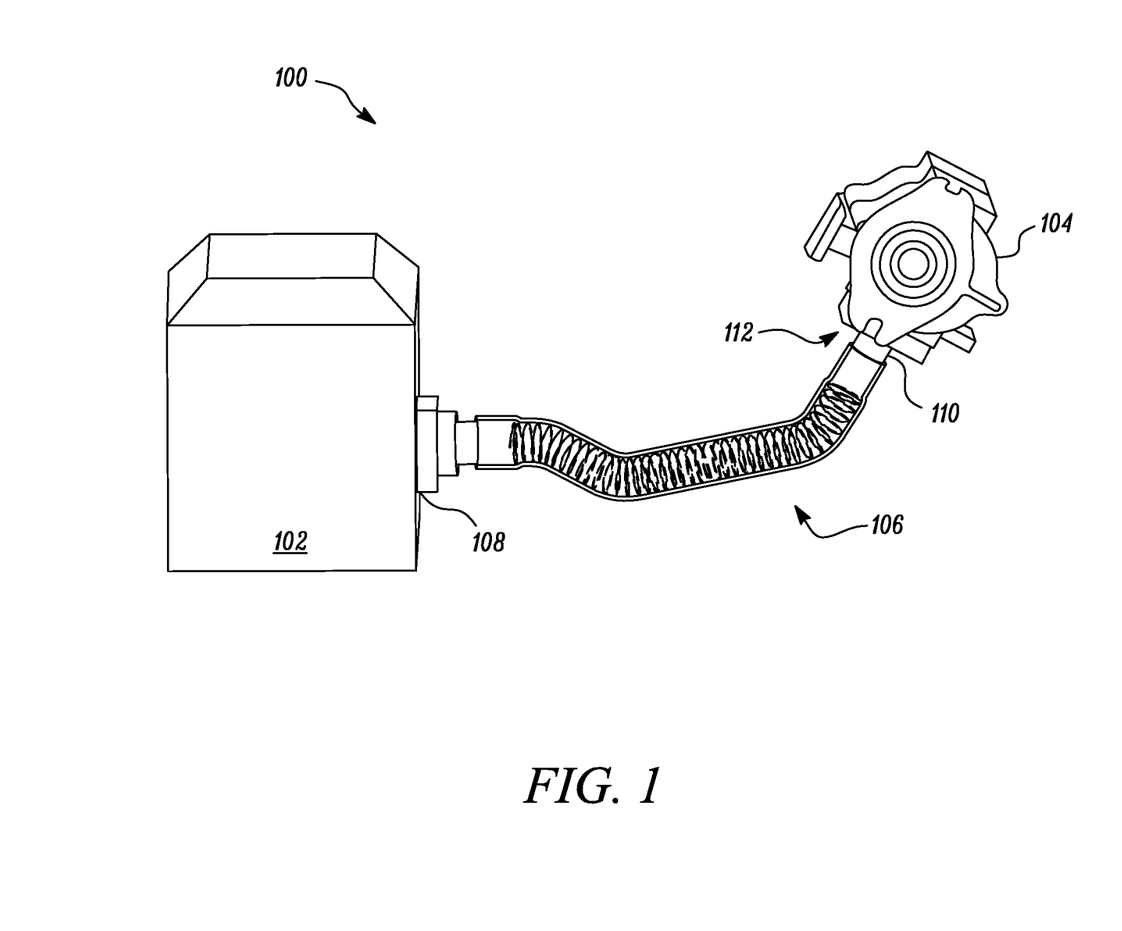
FIG. 1 is a perspective view of a portion of a hydraulic system, accordingly to an embodiment of the present disclosure.

Wherever possible, the same reference numbers will be used throughout the drawings to refer to the same or like parts. Referring to FIG. 1, a perspective view of a portion of a hydraulic system 100 is illustrated. The hydraulic system 100 is embodied as a hydraulic fluid energy system that may be used to power one or more hydraulic components of a vehicle (not shown), such as a construction vehicle. For example, the hydraulic system 100 may be used to power linkages or implements of the construction vehicle. More particularly, the hydraulic system 100 may supply a pressurized hydraulic fluid to hydraulic actuators or pumps that are further drivably coupled to various components associated with the vehicle.

The hydraulic system 100 may also be associated with a braking system of the vehicle. Alternatively, the hydraulic system 100 may provide hydraulic fluid for lubrication of drive train components or the hydraulic system 100 may supply hydraulic fluid to a hydraulic fan drive system or any other hydraulic circuits in the vehicle. Although a single hydraulic system 100 is represented herein, the vehicle may include multiple hydraulic systems 100 associated with different components of the vehicle.

The hydraulic system 100 includes a first component 102, a second component 104, and a hose assembly 106. For exemplary purposes, only a portion of the hydraulic system 100 is illustrated herein, however, the hydraulic system 100 may include a number of valves, hoses, pumps, actuators, reservoirs, and the like, without any limitations. Further, although the first component 102, the second component 104, and the hose assembly 106 are explained in relation to the hydraulic system 100, it may be contemplated to utilize the first component 102, the second component 104, and the hose assembly 106 in a pneumatic system. Thus, details of various components and their arrangements described in this section is equally applicable to pneumatic systems that are generally known in the art. Such pneumatic systems may be associated with vehicles to power various pneumatic components of the vehicle.

The first component 102 is embodied as a fluid reservoir herein. The first component 102 may be hereinafter interchangeably referred to as "the fluid reservoir 102", without limiting the scope of the present disclosure. The fluid reservoir 102 stores the hydraulic fluid therein and may maintain a temperature of the stored hydraulic fluid. Further, the second component 104 is a pump, and more particularly a hydraulic pump, which may be driven by an engine (not shown) of the vehicle. The second component 104 may be hereinafter interchangeably referred to as "the pump 104", without limiting the scope of the present disclosure.

The first component 102 is fluidly coupled to the second component 104 by the hose assembly 106. The hose assembly 106 may be associated with the hydraulic system 100 or the pneumatic system, as per application requirements. It should be noted that although the hose assembly 106 is connected between the first component 102 and the second component 104 that are embodied as the fluid reservoir and the pump herein, the first and second components 102, 104 may be embodied as other components of the hydraulic system 100 that are coupled via the hose assembly 106. It should be further noted that although a direct fluid connection between the fluid reservoir 102 and the pump 104 is illustrated herein, the hydraulic system 100 may include a valve (not shown) that is disposed between the fluid reservoir 102 and the pump 104. The valve may allow or prevent fluid communication between the fluid reservoir 102 and the pump 104 based on activation and deactivation of the valve. In such examples, the hose assembly 106 may be disposed between the valve and the pump 104.

Further, as illustrated herein, the hose assembly 106 is fluidly coupled to the fluid reservoir 102 at an outlet 108 of the fluid reservoir 102. Moreover, the hose assembly 106 is coupled at a suction side 112 of the pump 104. More particularly, the hose assembly 106 is fluidly coupled to the hydraulic pump 104 at an inlet 110 of the pump 104. Thus, the hose assembly 106 introduces a fluid flow in the pump 104.

Figure 2:
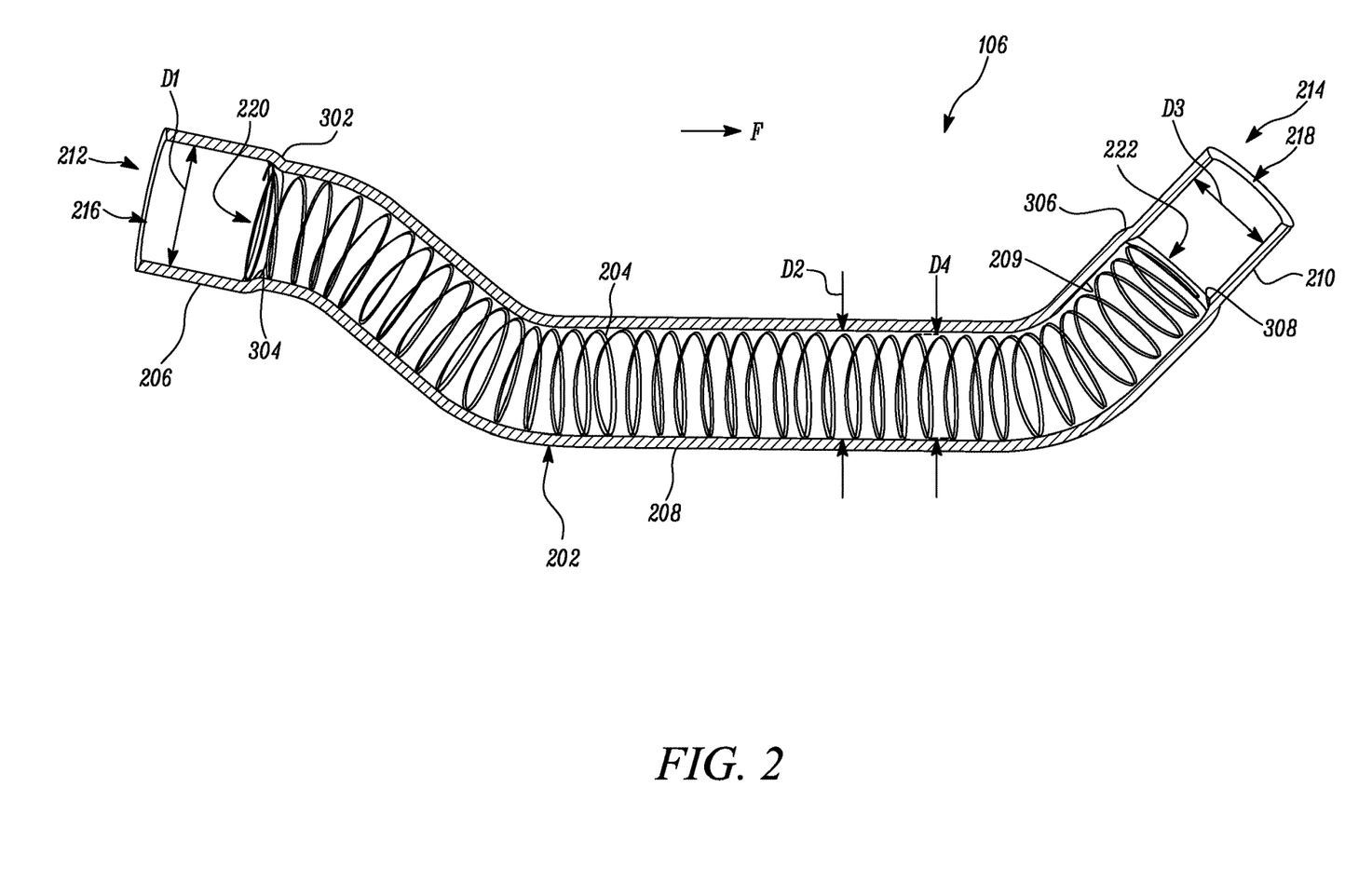
FIG. 2 illustrates a hose assembly including a hose associated with the hydraulic system of FIG. 1.

FIG. 2 illustrates the hose assembly 106. The hose assembly 106 defines an upstream end 212 and a downstream end 214. The fluid flow through the hose assembly 106 is depicted by a flow direction "F". Further, the hose assembly 106 defines a hose inlet 216 and a hose outlet 218. The hose inlet 216 is located at the upstream end 212 of the hose assembly 106. Specifically, the hose inlet 216 of the hose assembly 106 is fluidly coupled to the outlet 108 (see FIG. 1) of the fluid reservoir 102 (see FIG. 1). Further, the hose outlet 218 is located at the downstream end 214 of the hose assembly 106. Specifically, the hose outlet 218 of the hose assembly 106 is fluidly coupled to the inlet 110 (see FIG. 1) of the pump 104 (see FIG. 1).

The hose assembly 106 includes a hose 202 and a support member 204. The accompanying figure shows a cut-away view of the hose 202 to illustrate the support member 204 disposed therein. The hose 202 includes a circular cross-section. Generally, the hose 202 is made of a flexible material. In an embodiment, the hose 202 is made of rubber. In other embodiments, the hose 202 is made of silicone. The hose 202 includes a first portion 206. The first portion 206 defines a first diameter "D1". The first diameter "D1" is embodied as an internal diameter of the first portion 206. The first portion 206 is disposed proximal to the upstream end 212 of the hose assembly 106. The first portion 206 is fluidly coupled to the fluid reservoir 102. Thus, the fluid flow enters the hose assembly 106 through the first portion 206 of the hose 202.

Figure 3:
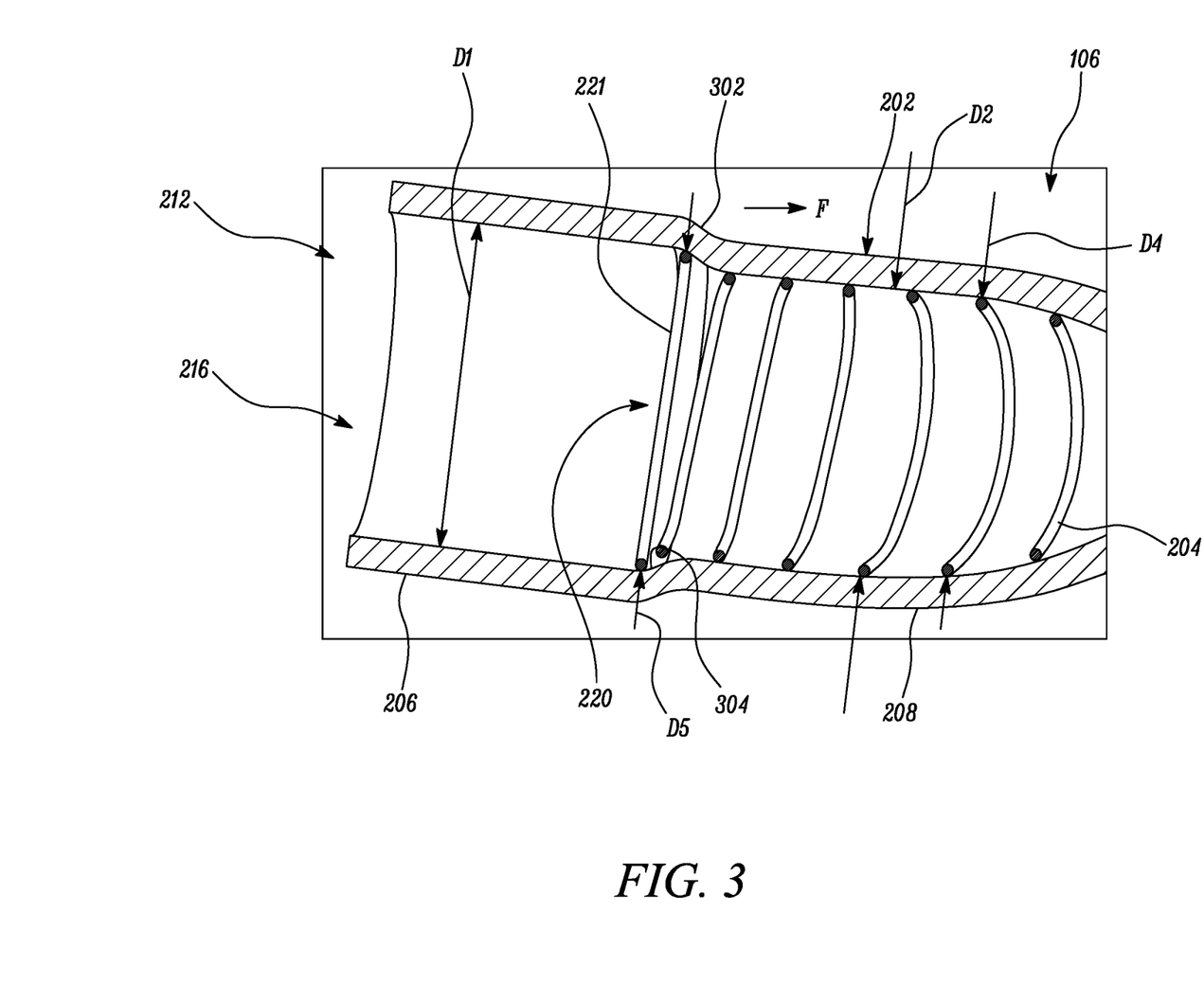
FIG. 3 illustrates a cross-sectional view of a first portion and a second portion of the hose of FIG. 2.

Further, the hose 202 includes a second portion 208. The second portion 208 is disposed adjacent to the first portion 206. The second portion 208 defines a second diameter "D2" that is different from the first diameter "D1". The second diameter "D2" is embodied as an internal diameter of the second portion 208. Further, a difference between the first diameter "D1" and the second diameter "D2" is referred to as a first variation "D1-D2". Moreover, the hose 202 defines a first flange portion 302. The first variation "D1-D2" may be defined as a difference between the first and second diameters "D1", "D2". The first flange portion 302 is defined at an intersection of the first portion 206 and the second portion 208. The first flange portion 302 defines a first circumferential surface 304. The first circumferential surface 304 varies in diameter along the flow direction "F". As the first diameter "D1" is greater than the second diameter "D2", the diameter of the first circumferential surface 304 decreases along the flow direction "F".

Further, the hose 202 includes a third portion 210. The third portion 210 of the hose 202 is disposed adjacent to the second portion 208 such that the second portion 208 extends between the first and third portions 206, 210. The third portion 210 is proximal to the downstream end 214 of the hose assembly 106. The third portion 210 is fluidly coupled to the pump 104. Thus, the fluid flow exits the hose assembly 106 through the third portion 210 of the hose 202. Accordingly, the first portion 206, the second portion 208, and the third portion 210 lie along the flow direction "F" between the upstream end 212 and the downstream end 214 such that fluid is delivered from the fluid reservoir 102 to the pump 104.

The third portion 210 defines a third diameter "D3" that is different from the first diameter "D1" and the second diameter "D2". The third diameter "D3" is embodied as an internal diameter of the third portion 210. It should be noted that the first diameter "D1" is greater than the second diameter "D2" and the third diameter "D3". Further, the second diameter "D2" is greater than the third diameter "D3". Moreover, a difference between the second diameter "D2" and the third diameter "D3" is referred to as a second variation "D2-D3". The first variation "D2-D3" may be defined as a difference between the second and third diameters "D2", "D3". In the illustrated embodiment, the first variation "D1-D2" between the first and second diameters "D1", "D2" is substantially equal to the second variation "D2-D3" between the second and third diameters "D2", "D3". However, in other embodiments, the first variation "D1-D2" between the first and second diameters "D1", "D2" may be different from the second variation "D2-D3" between the second and third diameters "D2", "D3".

Figure 4:
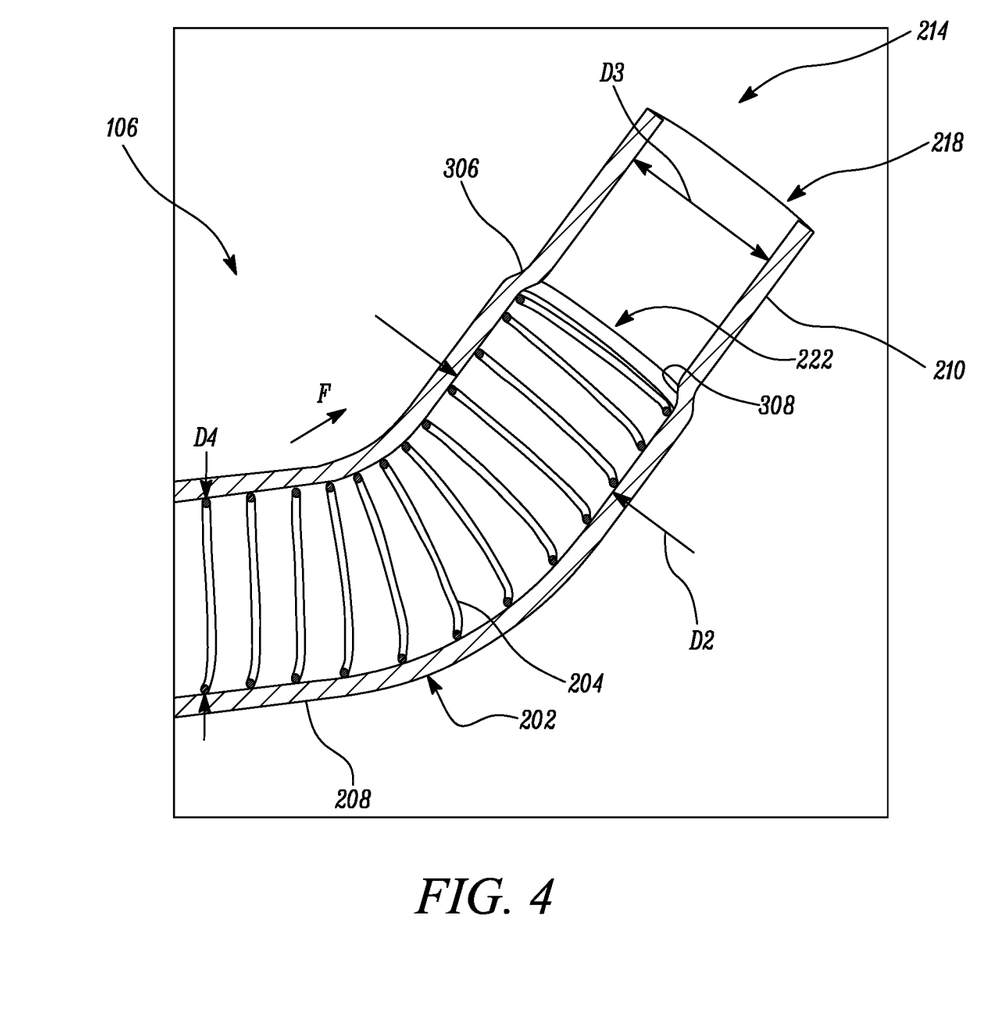
FIG. 4 illustrates a cross-sectional view of the second portion and a third portion of the hose of FIG. 2.

Further, the hose 202 defines a second flange portion 306. The second flange portion 306 is defined at an intersection of the second portion 208 and the third portion 210. The second flange portion 306 defines a second circumferential surface 308. The second circumferential surface 308 varies in diameter along the flow direction "F". As the first diameter "D2" is greater than the second diameter "D3", the diameter of the second circumferential surface 308 decreases along the flow direction "F".

Further, the hose assembly 106 includes the support member 204 disposed within the hose 202. Specifically, the support member 204 is disposed within the second portion 208. The support member 204 is concentrically disposed within the second portion 208 of the hose 202. The support member 204 is in contact with an inner surface 209 of the second portion 208. Accordingly, a fourth diameter "D4" of the support member 204 is substantially equal to the second diameter "D2" of the second portion 208. Further, a length of the support member 204 is decided such that the support member 204 is retained within the second portion 208 when the support member 204 is in a retracted position.

In the illustrated embodiment, the support member 204 is a spring member. More specifically, the support member 204 is a helical spring. The support member 204 may be generally embodied as a spiral wrapped spring. In an example, the support member 204 may be a metallic helical spring. Alternatively, the support member 204 may be a helical spring made of plastic (e.g. polypropylene). It should be noted that the support member 204 may include any other shape, as per application requirements, such that the said shape of the support member 204 provides sufficient sturdiness to the hose assembly 106.

It should be noted that the fluid flow exerts a fluid force on the support member 204 while flowing therethrough. Accordingly, the support member 204 may retract based on an application of the fluid force. The support member 204 defines a first end portion 220 and a second end portion 222. In an assembled condition of the hose assembly 106, the first end portion 220 is located proximal to the upstream end 212 and the second end portion 222 is located proximal to the downstream end 214. The first end portion 220 engages with the first flange portion 302 and the second end portion 222 engages with the second flange portion 306 for retention of the support member 204 within the second portion 208.

Referring to FIG. 3, a portion of the hose assembly 106 is illustrated. Specifically, FIG. 3 shows a close-up sectional view of the hose assembly 106 with a transition of hose size from the first portion 206 to the second portion 208. As illustrated, the first end portion 220 of the support member 204 includes an expanded end 221. The expanded end 221 is positioned adjacent to the first flange portion 302. In some examples, a diameter "D5" of the expanded end 221 may be greater than the diameter defined by the first circumferential surface 304 and the fourth diameter "D4". Further, the first end portion 220 abuts with the first circumferential surface 304. Specifically, the expanded end 221 of the first end portion 220 allows abutment of the first end portion 220 with the first circumferential surface 304.

FIG. 4 is a close-up sectional view of the second portion 208 and the third portion 210 that illustrates a transition in the hose size from the second portion 208 to the third portion 210. As illustrated, the second end portion 222 abuts with the second circumferential surface 308. It should be noted that the length of the support member 204 is such that the second end portion 222 abuts with the second circumferential surface 308. Further, the fourth diameter "D4" of the support member 204 is greater than the diameter defined by the second circumferential surface 308. Thus, the support member 204 is retained within the hose 202 based on the engagement of the first end portion 220 with the first flange portion 302 and the engagement of the second end portion 222 with the second flange portion 306.

It is to be understood that individual features shown or described for one embodiment may be combined with individual features shown or described for another embodiment. The above described implementation does not in any way limit the scope of the present disclosure. Therefore, it is to be understood although some features are shown or described to illustrate the use of the present disclosure in the context of functional segments, such features may be omitted from the scope of the present disclosure without departing from the spirit of the present disclosure as defined in the appended claims.

INDUSTRIAL APPLICABILITY

Figure 5:
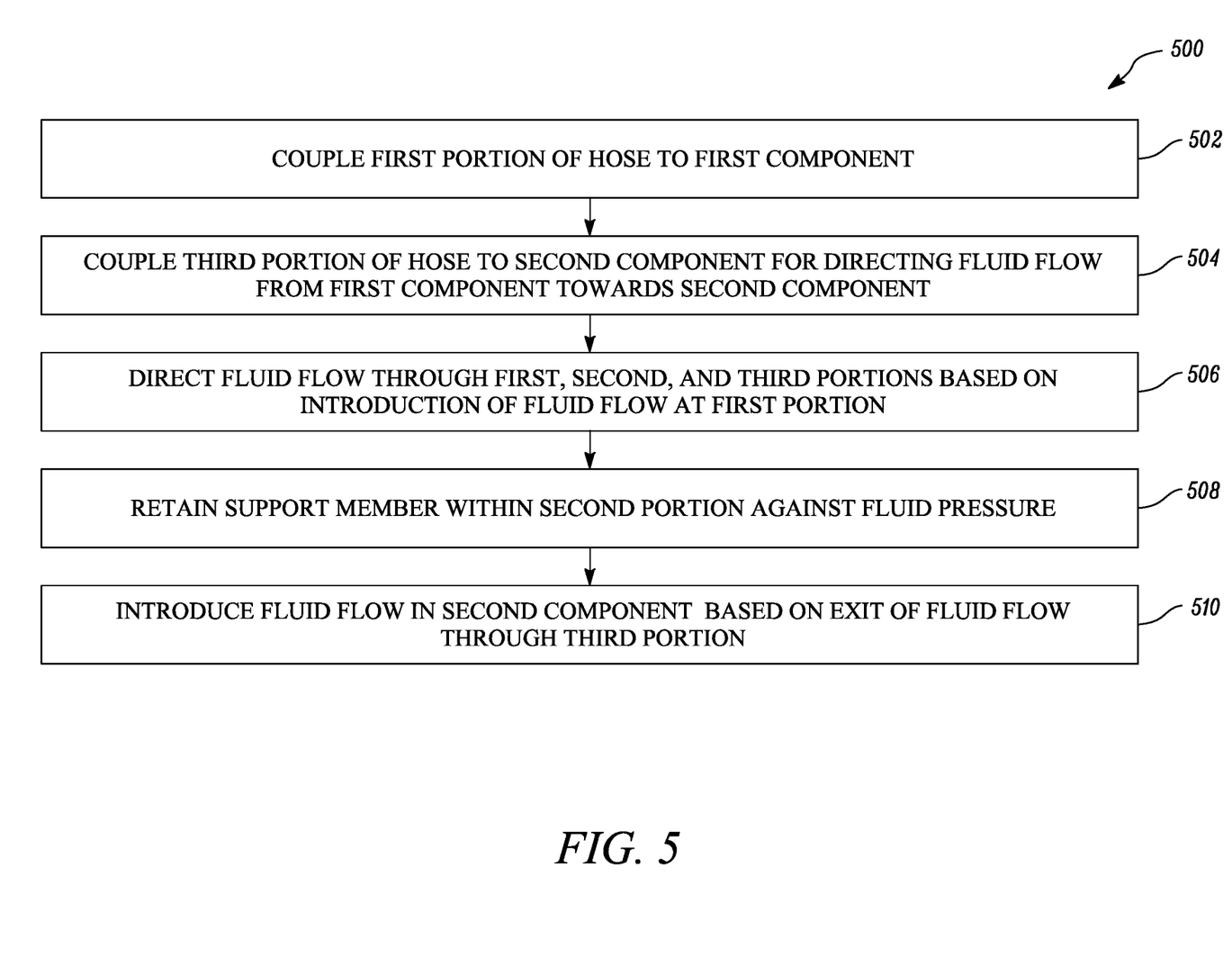
FIG. 5 is a flowchart for a method of using the hose assembly of FIG. 2.

This section will now be described in relation to utilization of the hose assembly 106 associated with the hydraulic system 100. However, it should be noted that the details provided below can be applied to hose assemblies associated with any known pneumatic systems or for general fluid conveyance, without any limitations. Referring to FIG. 5, a flowchart for a method 500 of using the hose assembly 106 for directing the fluid flow therethrough is illustrated. The hose assembly 106 is coupled at the suction side 112 of the pump 104. The hose assembly 106 includes the hose 202 and the support member 204 disposed within the hose 202. The flowchart for the method 500 includes a series of steps for directing the fluid flow through the hose assembly 106.

At step 502, the first portion 206 of the hose 202 is coupled to the first component 102. The first portion 206 defines the first diameter "D1". The hose 202 further includes the second portion 208 defining the second diameter "D2" that is lesser than the first diameter "D1" and the third portion 210 defining the third diameter "D3" that is lesser than the first diameter "D1" and the second diameter "D2". At step 504, the third portion 210 of the hose 202 is coupled to the second component 104. More particularly, the third portion 210 of the hose 202 is coupled to the pump 104.

At step 506, the fluid flow is directed through the first, second, and third portions 206, 208, 210 based on introduction of the fluid flow at the first portion 206. The fluid flow is adapted to apply the fluid force on the support member 204. At step 508, the support member 204 is retained within the second portion 208 against the fluid force based on the engagement of the first end portion 220 of the support member 204 with the first flange portion 302 defined at the intersection of the first and second portions 206, 208 and the engagement of the second end portion 222 of the support member 204 with the second flange portion 306 defined at the intersection of the second and third portions 208, 210. More particularly, the support member 204 is retained within the second portion 208 based on the abutment of the first end portion 220 with the first circumferential surface 304 defined by the first flange portion 302. Further, the support member 204 is retained within the second portion 208 based on the abutment of the second end portion 222 with the second circumferential surface 308 defined by the second flange portion 306. At step 510, the fluid flow is introduced in the second component 104 based on the exit of the fluid flow through the third portion 210.

The inclusion of the first flange portion 302 and the second flange portion 306 in the hose 202 based on the changes in the diameters "D1", "D2", "D3" allows retention of the support member 204 within the hose 202. The retention of the support member 204 in turn results in the hose 202 that demonstrates improved vacuum resistance. Further a geometry of the hose 202 described herein assures that the support member 204 cannot be installed backwards. More particularly, the support member 204 includes the expanded end 221 that assures the support member 204 is installed accurately within the hose 202, thereby reducing possibility of installation errors and also assuring that the support member 204 is retained within the second portion 208.

Further, the change in diameters "D1", "D2", "D3" at the different portions 206, 208, 210 prevents the support member 204 from being moved out of position within the hose 202 on account of the fluid force. Furthermore, due to the third diameter "D3" being lesser than the second diameter "D2", a possibility of the support member 204 being pulled towards the third portion 210 is eliminated. Thus, a probability of failures in the hydraulic system 100 due to interaction of the support member 204 with moving components positioned downstream of the hose assembly 106 is eliminated.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of the disclosure. Such embodiments should be understood to fall within the scope of the present disclosure as determined based upon the claims and any equivalents thereof.

What is claimed is:

1. A hose assembly comprising:
    a hose including:
        a first portion defining a first diameter,
            wherein an inner portion of the first portion is configured to receive an outlet of a fluid reservoir;
        a second portion disposed adjacent to the first portion, wherein the second portion defines a second diameter that is less than the first diameter, and
            wherein a first flange portion is defined at an intersection of the first portion and the second portion; and
        a third portion disposed adjacent to the second portion such that the second portion extends between the first portion and the third portion,
            wherein an inner portion of the third portion is configured to receive an inlet of a pump,
            wherein the third portion defines a third diameter that is less than the first diameter and the second diameter, and
            wherein a second flange portion is defined at an intersection of the second portion and the third portion; and
    a support member disposed within the second portion,
        wherein the support member is a spring,
        wherein the support member comprises:
            a first end portion of the support member, and
            a second end portion of the support member,
            wherein the first end portion of the support member is adapted to engage with the first flange portion,
            wherein the second end portion of the support member is adapted to engage with the second flange portion for retention of the support member within the second portion, and
        wherein the second end portion of the support member is retained within the second portion.

2. The hose assembly of claim 1, wherein the support member is concentrically disposed within the second portion.

3. The hose assembly of claim 1, wherein a first variation between the first diameter and the second diameter is substantially equal to a second variation between the second diameter and the third diameter.

4. The hose assembly of claim 1, wherein the first flange portion defines a first circumferential surface.

5. The hose assembly of claim 4, wherein the first end portion of the support member is adapted to abut with the first circumferential surface.

6. The hose assembly of claim 1, wherein the second flange portion defines a second circumferential surface.

7. The hose assembly of claim 6, wherein the second end portion of the support member is adapted to abut with the second circumferential surface.

8. The hose assembly of claim 1, wherein the spring is a helical spring.

9. The hose assembly of claim 1, wherein a fluid flow enters the hose assembly through the first portion.

10. The hose assembly of claim 9, wherein the fluid flow exits the hose assembly through the third portion.

11. The hose assembly of claim 1, wherein the hose assembly is associated with at least one of a hydraulic system and a pneumatic system.

12. The hose assembly of claim 1, wherein the hose assembly is coupled at a suction side of the pump.

13. The hose assembly of claim 1,
    wherein the first end portion of the support member includes an expanded end,
    wherein the expanded end is positioned adjacent to the first flange portion, and
    wherein a fourth diameter of the expanded end is greater than a fifth diameter defined by a circumferential surface of the first flange portion.

14. The hose assembly of claim 1,
    wherein the second end portion of the support member abuts with a second circumferential surface of the second flange portion, and wherein a fourth diameter of the support member is greater than a fifth diameter defined by the second circumferential surface of the second flange portion.

15. A hose comprising:
a first portion that defines a first internal diameter,
wherein an inner portion of the first portion is configured to receive a first component;
a second portion that defines a second internal diameter that is less than the first internal diameter,
wherein an inner surface of the second portion is configured to be in contact with a support member, and
wherein the support member is a spring;
a first flange portion at an intersection of the first portion and the second portion,
wherein the first flange portion defines a first circumferential surface that decreases in diameter along a flow direction, and
wherein the first flange portion is configured to engage with a first end portion of the support member and retain the support member within the second portion;
a third portion that defines a third internal diameter that is less than the first internal diameter and the second internal diameter,
wherein an inner portion of the third portion is configured to receive a second component; and
a second flange portion at an intersection of the second portion and the third portion,
wherein the second flange portion defines a second circumferential surface that decreases in diameter along the flow direction, and
wherein the second flange portion is configured to engage with a second end portion of the support member and retain the support member within the second portion.

16. The hose of claim 15,
wherein the first component is an outlet of a fluid reservoir, and
wherein the second component is an inlet of a pump.

17. A method of using a hose assembly for directing a fluid flow therethrough, wherein the hose assembly includes a hose and a support member disposed within the hose, the method comprising:
coupling an inner portion of a first portion of the hose to an outlet of a fluid reservoir,
wherein the first portion defines a first diameter,
wherein the hose further includes a second portion and a third portion,
wherein the second portion defines a second diameter that is less than the first diameter, and
wherein the third portion defines a third diameter that is less than the first diameter and the second diameter;
coupling the third portion of the hose to an inlet of a pump for directing the fluid flow from the outlet of a fluid reservoir and towards the inlet of the pump;
directing the fluid flow through the first portion, the second portion, and the third portion based on introduction of the fluid flow at the first portion,
wherein the fluid flow is adapted to apply a fluid force on the support member;
retaining the support member within the second portion against the fluid force based on an engagement of a first end portion of the support member with a first flange portion defined at an intersection of the first portion and the second portion and an engagement of a second end portion of the support member with a second flange portion defined at an intersection of the second portion and the third portion,
wherein the second end portion of the support member is retained within the second portion; and
introducing the fluid flow in the inlet of the pump based on an exit of the fluid flow through the third portion.

18. The method of claim 17, wherein the first end portion of the support member abuts a circumferential surface defined by the first flange portion.

19. The method of claim 17, wherein the second end portion of the support member abuts a circumferential surface defined by the second flange portion.

20. The method of claim 17, further comprising coupling the hose assembly at a suction side of the pump.

* * * * *